(12) United States Patent
Kniesel et al.

(10) Patent No.: US 10,759,931 B2
(45) Date of Patent: *Sep. 1, 2020

(54) HIGH FLOW HETEROPHASIC POLYOLEFIN COMPOSITIONS HAVING IMPROVED STIFFNESS/IMPACT BALANCE

(71) Applicant: BOREALIS AG, Vienna (AT)

(72) Inventors: Claudia Kniesel, Linz (AT); Minna Aarnio-Winterhof, Altenberg (AT); Karlheinz Friedrich, Weiden am See (AT); Markus Gahleitner, Neuhofen/Krems (AT); Friedrich Berger, Linz (AT)

(73) Assignee: BOREALIS AG (AT)

( * ) Notice: Subject to any disclaimer, the term of this patent is extended or adjusted under 35 U.S.C. 154(b) by 99 days.

This patent is subject to a terminal disclaimer.

(21) Appl. No.: 16/079,504

(22) PCT Filed: Mar. 1, 2017

(86) PCT No.: PCT/EP2017/054685
§ 371 (c)(1),
(2) Date: Aug. 23, 2018

(87) PCT Pub. No.: WO2017/148970
PCT Pub. Date: Sep. 8, 2017

(65) Prior Publication Data
US 2019/0284379 A1    Sep. 19, 2019

(30) Foreign Application Priority Data
Mar. 4, 2016 (EP) .................................... 16158605

(51) Int. Cl.
| C08L 23/12 | (2006.01) |
| C08J 3/22 | (2006.01) |
| C08K 5/00 | (2006.01) |
| C08K 5/098 | (2006.01) |
| C08K 5/134 | (2006.01) |
| C08K 5/521 | (2006.01) |
| C08L 23/08 | (2006.01) |
| C08L 23/16 | (2006.01) |
| C08L 23/20 | (2006.01) |

(52) U.S. Cl.
CPC ............... *C08L 23/12* (2013.01); *C08J 3/22* (2013.01); *C08K 5/0083* (2013.01); *C08K 5/098* (2013.01); *C08K 5/1345* (2013.01); *C08K 5/521* (2013.01); *C08L 23/0815* (2013.01); *C08L 23/16* (2013.01); *C08L 23/20* (2013.01); *C08J 2323/10* (2013.01); *C08L 2205/025* (2013.01); *C08L 2205/03* (2013.01); *C08L 2205/035* (2013.01); *C08L 2207/02* (2013.01); *C08L 2314/02* (2013.01)

(58) Field of Classification Search
CPC ...... C08K 5/1345; C08K 5/521; C08K 5/098; C08F 4/6465; C08F 2/001; C08F 210/16; C08F 2500/12; C08F 2500/17; C08L 23/16; C08L 23/20; C08L 23/12; C08L 2205/03; C08L 2207/02; C08L 2205/025; C08L 2205/035
See application file for complete search history.

(56) References Cited

U.S. PATENT DOCUMENTS

| 2013/0281630 A1* | 10/2013 | Leskinen et al. ..... C08F 110/06 525/240 |
| 2019/0315952 A1* | 10/2019 | Kniesel et al. ...... C08K 5/1345 |

FOREIGN PATENT DOCUMENTS

| EP | 0491566 B1 | 9/1992 |
| EP | 0586390 B1 | 3/1994 |
| EP | 0591224 B1 | 4/1994 |
| EP | 0887379 A1 | 12/1998 |
| EP | 2599829 A1 | 6/2013 |
| EP | 2610271 A1 | 7/2013 |
| EP | 2610272 A1 | 7/2013 |
| EP | 2610273 A1 | 7/2013 |
| EP | 2727958 A1 | 5/2014 |
| KR | 10-2014-0089605 A | 7/2014 |
| WO | 92/12182 A1 | 7/1992 |
| WO | 99/24479 A1 | 10/1994 |
| WO | 99/24478 A1 | 5/1999 |
| WO | 00/68315 A1 | 11/2000 |
| WO | 2004/000899 A1 | 12/2003 |
| WO | 2004/111095 A1 | 12/2004 |
| WO | 2009/129873 A1 | 10/2009 |
| WO | 2010/049448 A1 | 5/2010 |
| WO | 2012/007430 A1 | 1/2012 |
| WO | 2014/056175 A1 | 4/2014 |

OTHER PUBLICATIONS

Office action for Korean Patent Application No. 10-2018-7025767, dated Jul. 12, 2019.
Office action for India Patent Application No. 201817030726, dated Dec. 13, 2019.
Zhou et al., "A new decoupling method for accurate quantification of polyethylene copolymer composition and triad sequence distribution with 13C NMR", Journal of Magnetic Resonance 187 (2007) pp. 225-233.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.

(Continued)

*Primary Examiner* — Nathan M Nutter
(74) *Attorney, Agent, or Firm* — Tarolli, Sundheim, Covell & Tummino LLP

(57) ABSTRACT

High flow nucleated heterophasic polyolefin compositions comprising a matrix comprising a propylene homo- and/or copolymer and an elastomeric alpha-olefin copolymer phase dispersed in the matrix, which have rather high melt flow rate, improved impact strength but also an excellent impact/stiffness balance and a process for the preparation of such a heterophasic polyolefin composition, articles made therefrom and uses of the heterophasic polyolefin composition.

18 Claims, 1 Drawing Sheet

(56) References Cited

OTHER PUBLICATIONS

Busico et al., "Microstructure of polypropylene", Prog. Polym. Sci. 26 (2001) 443-533.
Busico et al., "Full Assignment of the 13C NMR Spectra of Regioregular Polypropylenes: Methyl and Methylene Region", Macromolecules 1997, 30, 6251-6263.
H.N. Cheng, "13C NMR Analysis of Ethylene-Propylene Rubbers", Macromolecules 1984, 17, 1950-1955.
Kakugo et al., "13C NMR Determination of Monomer.Sequence Distribution in Ethylene-Propylene Copolymers Prepared with d-TiC13-A1(C2H5)2C1" Macromolecules 1982, 15, pp. 1150-1152.
Resconi et al., "Selectivity in Propene Polymerization with Metallocene Catalysts", Chem. Rev. 2000, 100, pp. 1253-1345.
Singh et al., "Triad sequence determination of ethylene-propylene copolymers—application of quantitative 13C NMR", Polymer Testing 28 (2009) pp. 475-479.
Wang et al., "Structural Analysis of Ethylene/Propylene Copolymers Synthesized with a Constrained Geometry Catalyst", Macromolecules 2000, 33, pp. 1157-1162.

\* cited by examiner

Figure 1:
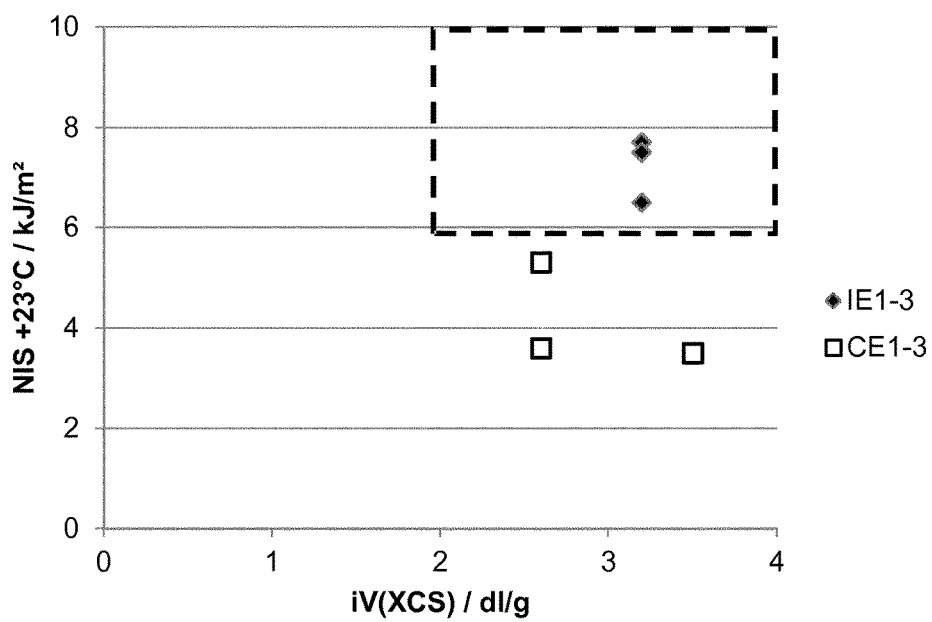
Figure 1:
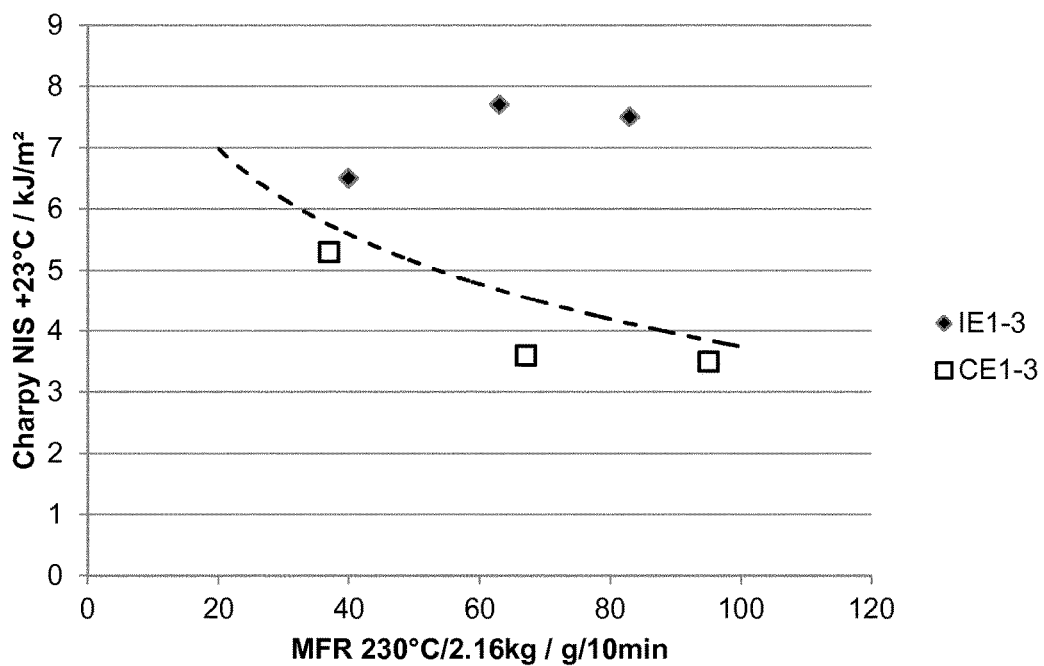

Figure 1 demonstrates the higher impact strength at comparable iV(XCS) for the inventive example IE1 to IE 3 compared to CE1 to CE3

Figure 2: inequation: NIS(23°C) > 13 - 2.01 ln(MFR$_T$)

HIGH FLOW HETEROPHASIC POLYOLEFIN COMPOSITIONS HAVING IMPROVED STIFFNESS/IMPACT BALANCE

The present invention relates to high flow nucleated heterophasic polyolefin compositions comprising a matrix comprising a propylene homo- and/or copolymer and an elastomeric alpha-olefin copolymer phase dispersed in the matrix having rather high melt flow rate, improved impact strength but also an excellent impact/stiffness balance. The present invention further relates to a process for the preparation of such a heterophasic polyolefin composition, articles made therefrom and uses of the heterophasic polyolefin composition.

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition.

As a consequence, the material becomes more brittle, thereby resulting in poor impact properties. Also with increase of melt flow rate the stiffness can be improved, however the impact properties significantly drop again. Thus impact behaviour and melt flow of a polymer behave in a conflicting manner.

It is known that impact strength of polypropylene can be improved by dispersing a rubber phase within the polymer matrix, thereby obtaining a heterophasic polypropylene composition.

There is an increasing market need for light-weight consumer packaging which can be manufactured with lower wall thicknesses, since it allows for energy and material savings. In order to provide a material equipped with these features, a highly stiff material with good impact properties needs to be developed. The high stiffness enables lower wall thicknesses of a packaging article.

Furthermore, cycle time reduction is possible since a certain stiffness needed for demoulding of the specimen is reached at shorter cooling times.

Additionally, the materials should show high flowability. Otherwise, injection moulding of specimen with thin wall thickness is not possible. High flow materials generally show high stiffness due to shorter polymer chains of high stereoregularity. However, the impact performance becomes reduced due to shorter polymer chains which form less entanglement. Thus, the challenge is to obtain a material, i.e. a heterophasic polyolefin composition of high flowability and high stiffness/impact balance.

Such heterophasic polyolefin compositions can be heterophasic propylene copolymers which comprise a matrix being either a propylene homopolymer or a random propylene copolymer in which an amorphous phase containing a propylene copolymer rubber (elastomer), is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

Many different types of heterophasic systems have been described depending on the individual requirements.

From WO 2009/129873 heterophasic propylene copolymers with high purity, which is shown in reduced volatiles content, reduced fogging and reduced hexane-solubles content, are known. These high purity heterophasic propylene copolymers are prepared with a multi-step polymerization procedure in the presence of a special Ziegler-Natta procatalyst which contains a trans-esterification product of a lower alcohol and a phthalic ester in combination with a special external donor. There is, however, a common market request for polymers being free of phthalic acid compounds.

From WO 2010/049448 further heterophasic propylene copolymers are known. These high purity heterophasic propylene copolymers are also prepared with a multi-step polymerization procedure in the presence of a special Ziegler-Natta procatalyst which contains a trans-esterification product of a lower alcohol and a phthalic ester in combination with a special external donor. The products described in this application however have limited impact strength.

However, some of such phthalate-compounds are under suspicion of generating negative health and environmental effects. Furthermore, there is an increasing demand on the market for "phthalate-free polypropylene" suitable for various applications, e.g. in the field of packaging and medical applications as well as personal care, or personal hygiene.

WO 2012007430 also incorporated herein by reference, is one example of a limited number of patent applications, describing phthalate free catalysts based on citraconate as internal donor.

However, up to now the mechanical properties of polypropylenes produced with catalyst having citraconate compositions as internal donors, did not fulfill all the desired requirements, especially in view of stiffness/impact-balance.

Therefore there is still a need for heterophasic polypropylene compositions, which show high flowability and an improved impact/stiffness balance and are especially suitable for thin wall injection moulded applications.

Hence, it is an object of the present invention to provide such a material.

It is a further object to provide a polypropylene composition obtainable by a multiple reaction stage process having the above mentioned unique property balance.

The present invention is based on the finding that the above object can be achieved by a nucleated heterophasic polyolefin composition with rather high melt flow rate, comprising specific matrix and rubber design.

So the present invention concerns a nucleated polypropylene composition and articles produced thereof which fulfil the higher stiffness-impact-requirements and preferably also the legal and health and environmental requirements.

The present invention in a special embodiment deals also with polymerization method, suitable for the production of the nucleated polypropylene composition.

SUMMARY OF THE INVENTION

The present invention is directed to a heterophasic propylene copolymer (HECO) comprising (a) a matrix (M) being a polypropylene (PP), said polypropylene (PP) comprises at least two polypropylene fractions (PP1) and (PP2) and optionally a third polypropylene fraction (PP3), and having a matrix melt flow rate (MFR$_M$) as determined at 230° C. and 2.16 kg load according to ISO 1133 in the range of 50.0 to 1000.0 g/10 min and
(b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises at least one propylene copolymer fractions (EPC1) and optionally a second propylene copolymer fraction (EPC2), wherein the elastomeric propylene copolymer (EC) is the xylene cold soluble fraction (XCS) determined at 25° C. according ISO 16152 of the heterophasic propylene copolymer (HECO) and has an intrinsic viscosity (iV) measured according to ISO 1628-1 (at 135° C. in decaline) in the range of 2.0 dl/g-4.0 dl/g.
(c) optionally a crystalline ethylene copolymer (CEC) with an α-olefin with 3-10 carbon atoms being present in the composition as inclusions of the dispersed particles of (b), and
(d) a polymeric nucleating agent (PNA),
(i) said heterophasic propylene copolymer (HECO) has a total melt flow rate (MFR$_T$) (230° C.) measured according to ISO 1133 in the range of 25.0 g/10 min to 250 g/10 min.

The special combination of especially Components (a), (b) and (d), gives rise to compositions having improved stiffness/impact balance compared to other heterophasic polypropylene compositions.

In a first embodiment of the present invention, the heterophasic polypropylene composition is free of phthalic acid esters as well as their respective decomposition products; preferably the heterophasic polypropylene composition is free of phthalic compounds as well as their respective decomposition products.

According to the present invention the term "phthalic compounds" refers to phthalic acid (CAS No. 88-99-3), its mono- and diesters with aliphatic, alicyclic and aromatic alcohols as well as phthalic anhydride.

In a further embodiment of the present invention, the heterophasic polypropylene composition comprises
(a) a matrix (M) being a polypropylene (PP), said polypropylene (PP) comprises three polypropylene fractions (PP1), (PP2) and a third polypropylene fraction (PP3), whereby the polypropylene (PP) is a random propylene copolymer (R-PP) or a propylene homopolymer (HPP), the latter being preferred and
(b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises only one propylene copolymer fractions (EPC1),
(c) optionally a crystalline ethylene copolymer (CEC) with an α-olefin with 3-10 carbon atoms being present in the composition as inclusions of the dispersed particles of (b), and
(d) a polymeric nucleating agent (PNA).

In yet a further embodiment the present invention, the heterophasic polypropylene composition comprises
(a) a matrix (M) being a polypropylene (PP), said polypropylene (PP) comprises two polypropylene fractions (PP1) and (PP2), whereby the polypropylene (PP) is a random propylene copolymer (R-PP) or a propylene homopolymer (HPP), the latter being preferred and
(b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises
(b-1) either only one propylene copolymer fractions (EPC1) or
(b-2) two propylene copolymer fractions (EPC1) and (EPC2),
(c) optionally a crystalline ethylene copolymer (CEC) with an α-olefin with 3-10 carbon atoms being present in the composition as inclusions of the dispersed particles of (b), and
(d) a polymeric nucleating agent (PNA).

The present invention further relates to a process for the production of the above heterophasic propylene polymer composition, comprising polymerizing propylene in at least 3 subsequent polymerization steps in the presence of a special phthalate-free Ziegler-Natta catalyst and introducing the polymeric nucleating agent either in a prepolymerization step or in the form of a masterbatch (MB) together with e.g. a carrier polymer.

In a further aspect the invention is related to the use of the composition for the production of films, extruded, blow moulded or injection moulded articles, such as pouches and bags, pipes and fittings, transport packaging containers as well as components for car exteriors and interiors, like dashboards, door claddings, consoles, bumpers and trims.

DETAILED DESCRIPTION

In the following the individual components are defined in more detail.

The particular heterophasic polypropylene composition of the present invention comprises at least
(a) the matrix (M) being a polypropylene (PP)
(b) the elastomeric propylene copolymer (EPC) dispersed in said matrix (M); and
(d) the polymeric nucleating agent, and
optionally component (c) crystalline ethylene copolymer (CEC),
as defined in more detail below.

The term "heterophasic polypropylene composition" used herein denotes compositions consisting of a polypropylene matrix resin and an elastomeric propylene copolymer dispersed in said matrix resin and a polymeric nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homo- or copolymer is present in such an amount that it can form a continuous phase which can act as a matrix.

Furthermore the terms "elastomeric propylene copolymer (EPC)", "xylene cold soluble (XCS) fraction of the heterophasic propylene copolymer", "dispersed phase" and "ethylene-propylene rubber" denote the same, i.e. are interchangeable.

Ad Component (A):

As indicated above the polypropylene (PP) comprises at least two and optionally three polypropylene fractions (PP1), (PP2), and (PP3).

Variant (I):

As indicated already above in one embodiment it is preferred that the matrix polypropylene (PP) comprises three polypropylene fractions (PP1), (PP2), and (PP3).

In this case the matrix (M), i.e. the polypropylene (PP) of the heterophasic propylene copolymer (HECO) comprises, preferably consist of, (a-1) a first polypropylene fraction (PP1) being a first propylene homopolymer (H-PP1) or a first random propylene copolymer (R-PP1), (a-2) a second polypropylene fraction (PP2) being a second propylene homopolymer (H-PP2) or a second random propylene copolymer (R-PP2), (a-3) a third polypropylene fraction (PP3) being a third propylene homopolymer (H-PP3) or a third random propylene copolymer (R-PP3), whereby at least one of the three fractions (PP1), (PP2) and (PP3) is a propylene homopolymer, preferably at least the first polypropylene fraction (PP1) is a propylene homopolymer, more preferably the first polypropylene fraction (PP1) and the second polypropylene fraction (PP2) are propylene homopolymers and most preferably all three propylene fractions (PP1), (PP2) and (PP3) are propylene homopolymers.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable.

In Variant (I) the three polypropylene fractions (PP1), (PP2), and (PP3) differ from each other by the melt flow rate MFR2 (230° C.) measured according to ISO 1133.

One of the three polypropylene fractions (PP1), (PP2), and (PP3), preferably the third polypropylene fraction (PP3), has a melt flow rate MFR2 (230° C.) measured according to ISO 1133 in the range of 1.0 to 15.0 g/10 min, preferably in the range of 2.0 to 15.0 g/10 min, still more preferably in the range of 2.0 to 13.0 g/10 min. Still more preferably the polypropylene fraction with the melt flow rate MFR2 (230° C.) measured according to ISO 1133 in the range of 1.0 to 15.0 g/10 min, i.e. in the range of 2.0 to 15.0 g/10 min, like in the range of 2.0 to 13.0 g/10 min, is the polypropylene fraction with the lowest melt flow rate MFR2 (230° C.) of the three polypropylene fractions (PP1), (PP2) and (PP3), preferably of all polypropylene fractions present, of the polypropylene (PP). Accordingly in one preferred embodiment the third polypropylene fraction (PP3) has the lowest melt flow rate MFR2 (230° C.) of the three polypropylene fractions (PP1), (PP2), and (PP3), wherein the melt flow rate MFR2 (230° C.) measured according to ISO 1133 of the third polypropylene fraction (PP3) is in the range of 1.0 to 15.0 g/10 min, preferably in the range of 2.0 to 15.0 g/10 min, still more preferably in the range of 2.0 to 13.0 g/10 min.

In addition to the requirement that one of the three polypropylene fractions (PP1), (PP2) and (PP3) must have a melt flow rate MFR2 (230° C.) measured according to ISO 1133 in the range of 1.0 to 15.0 g/10 min it is preferred that another fraction of the three polypropylene fractions (PP1), (PP2) and (PP3) has a melt flow rate MFR2 (230° C.) measured according to ISO 1133 in the range of 80.0 to 500.0 g/10 min, preferably in the range of 120.0 to 450.0 g/10 min, more preferably in the range of 150.0 to 450.0 g/10 min. Particularly the first polypropylene fraction (PP1) has a melt flow rate MFR2 (230° C.) measured according to ISO 1133 in the range of 80.0 to 500.0 g/10 min, preferably in the range of 120.0 to 450.0 g/10 min, more preferably in the range of 150.0 to 450.0 g/10 min.

In one preferred embodiment the remaining polypropylene fraction of the three polypropylene fractions (PP1), (PP2) and (PP3), preferably the second polypropylene fraction (PP2), has a melt flow rate MFR2 (230° C.) measured according to ISO 1133 in the range of 10.0 to 300.0 g/10 min, preferably in the range of 20.0 to 250.0 g/10 min, more preferably in the range of 30.0 to 200.0 g/10 min.

Thus the matrix (M) of Variant (I) is multimodal, i.e. trimodal. It preferably contains the three fractions (PP1), (PP2), and (PP3) in certain amounts. Fraction (PP1) is preferably present in an amount of 30.0 to 45.0 wt %, fraction (PP2) is preferably in present in an amount of 25.0 to 40.0 wt % and fraction (PP3) present in an amount of in 5.0 to 20.0 wt %, all weight percentages related to the matrix and summing up to 100% of the matrix.

"Multimodal", like "bimodal" or "trimodal" describes a probability distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in serial configuration, and using different conditions in each reactor, the different polymer fractions produced in the different reactors have each their own molecular weight distribution which may considerably differ from one another. The molecular weight distribution curve of the resulting final polymer can be seen as super-imposing of molecular weight distribution curves of the individual polymer fractions which will, accordingly, show distinct maxima, or at least be distinctively broadened compared with the curves for individual fractions. A polymer showing such molecular weight distribution curve is called bimodal, trimodal or multimodal, respectively.

Variant (II) In this embodiment it is preferred that the matrix (M) comprises two polypropylene fractions (PP1) and (PP2).

In this case the matrix (M), i.e. the polypropylene (PP) of the heterophasic propylene copolymer (HECO) comprises, preferably consist of, (a-1) a first polypropylene fraction (PP1) being a first propylene homopolymer (H-PP1) or a first random propylene copolymer (R-PP1) and (a-2) a second polypropylene fraction (PP2) being a second propylene homopolymer (H-PP2) or a second random propylene copolymer (R-PP2), whereby at least one of the two fractions (PP1) and (PP2) is a propylene homopolymer, preferably at least the first polypropylene fraction (PP1) is a propylene homopolymer, more preferably the first polypropylene fraction (PP1) and the second polypropylene fraction (PP2) are propylene homopolymers.

The polypropylene constituting the matrix in this case can be unimodal or multimodal, e.g. bimodal. Preferably the matrix is bimodal, meaning that the first polypropylene fraction (PP1) and the second polypropylene fraction (PP2) differ at least in their melt flow rate, optionally also in their comonomer content. According to one preferred embodiment, the melt flow rate of the (PP1) fraction is higher than the melt flow rate of the (PP2) fraction, the ratio MFR(PP1)/MFR(PP2) being in the range of 2 to 10.

The propylene homo- or copolymer (PP) constituting the matrix for Variant I or Variant II may be produced by a single- or multistage process polymerization of propylene or propylene with alpha-olefin and/or ethylene such as bulk polymerization, gas phase polymerization, solution polymerization or combinations thereof, using conventional catalysts. A homo- or copolymer can be made either in loop reactors or in a combination of loop and gas phase reactors. Those processes are well known to one skilled in the art.

As stated above in both cases the matrix (M) is preferably a propylene homopolymer.

When the propylene homopolymer matrix phase is unimodal with respect to the molecular weight distribution, it may be prepared in a single stage process e.g. a slurry (or bulk) or gas phase process in a slurry or gas phase reactor. Thus, a unimodal matrix phase may be polymerized in a slurry polymerization step only. Alternatively, the unimodal matrix may be produced in a multistage process (e.g. combination of slurry and gas phase) using at each stage process conditions which result in similar polymer properties.

The propylene homopolymer matrix, if it is of multimodal or bimodal character, can be produced by blending different polymer types, i.e. of different molecular weight and/or comonomer content. However in such a case it is preferred that the polymer components of the polypropylene matrix are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

The propylene homopolymer matrix has a melt flow rate $MFR_2$ (ISO 1133; 230° C.; 2.16 kg) in the range of 50.0 to 1000.0 g/10 min, preferably in the range of 70.0 to 700.0 g/10 min and more preferably in the range of 80.0 to 500.0 g/10 min.

The $MFR_2$ of the matrix is named matrix melt flow rate ($MFR_M$).

Moreover it is preferred that the amount of xylene solubles of the propylene homopolymer matrix is not too high. Xylene solubles are the part of the polymer soluble in cold xylene determined by dissolution in boiling xylene and letting the insoluble part crystallize from the cooling solution (determined at 25° C. according to ISO 16152). The xylene solubles fraction contains polymer chains of low stereo-regularity and is an indication for the amount of non-crystalline areas. Accordingly it is preferred that the xylene solubles fraction of the propylene homopolymer matrix is in the range of 0.5 wt % to 4.0 wt %, more preferably in the range of 0.7 wt % to 3.5 wt %. In an even more preferred embodiment the xylene solubles fraction is in the range of 0.8 wt % to 3.0 wt %.

The propylene homopolymer has a melting temperature $T_{m1}$ as determined by DSC analysis according to ISO 11357.

Preferably, $T_{m1}$ of the propylene homopolymer is within the range of 160° C. to 170° C., more preferably within the range of 161° C. to 169° C. and most preferably within the range of 162° C. to 168° C.

As stated above, the propylene homopolymer matrix can be unimodal or multimodal, like bimodal or trimodal.

Concerning the definition of unimodal and multimodal, like bimodal or trimodal, it is referred to the definition above.

Ad Component (b):

Component b) is an elastomeric propylene copolymer (EPC), which is a copolymer of propylene and ethylene and/or an α-olefin with 4-10 carbon atoms being dispersed in said matrix (M) (i.e. dispersed phase), and said elastomeric propylene copolymer (EPC) comprises at least one propylene copolymer fractions (EPC1) and optionally a second propylene copolymer fraction (EPC2).

Component (b) of the particular heterophasic polypropylene composition is a predominantly amorphous propylene copolymer.

In general the elastomeric propylene copolymer (EPC) comprises copolymers of propylene and ethylene or propylene and an α-olefin with 4-10 carbon atoms, like 1-butene or 1-hexene.

Preferably the elastomeric propylene copolymer (EPC) is a copolymer of propylene and ethylene.

The elastomeric propylene copolymer (EPC) has a total comonomer content, preferably total ethylene content, in the range of 25.0 to 45.0 wt %, preferably in the range of 30.0 to 42.0 wt % and more preferably in the range of 32.0 to 41.0 wt %.

As stated above, the terms "elastomeric propylene copolymer (EPC)", "xylene cold soluble (XCS) fraction of the heterophasic propylene copolymer", "dispersed phase" and "ethylene-propylene rubber" denote the same, i.e. are interchangeable.

Thus the amount of elastomeric propylene copolymer (EPC) constitutes the amount of the xylene cold soluble (XCS) fraction of the heterophasic propylene copolymer, which is in the range of 10.0 to 30.0 wt % in view of the heterophasic propylene copolymer, preferably in the range of 12.0 to 28.0 wt % and more preferably in the range of 15.0 to 25.0 wt %.

The intrinsic viscosity (iV) measured according to ISO 1628-1 (at 135° C. in decaline) of the XCS fraction is in the range of 2.0 to 4.0 dl/g, preferably in the range of 2.5 to 3.8 dl/g and more preferably in the range of 2.6 to 3.6 dl/g.

Like the propylene homopolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution.

Concerning the definition of unimodal and multimodal, like bimodal, it is referred to the definition above.

Preferably the unimodal dispersed phase is made in one reaction stage, more preferably in a gas phase reactor ad comprises, respectively consists of one propylene copolymer fractions (EPC1).

In another embodiment the dispersed phase comprises, preferably consists of two fractions, e.g. one propylene copolymer fractions (EPC1) and a second propylene copolymer fraction (EPC2).

These two fractions are preferably in-situ blended. The fractions (EPC1) and (EPC2) are preferably obtainable as described later.

In this case the two fractions (EPC1) and (EPC2) differ in view of the intrinsic viscosity and/or the comonomer distribution.

Preferably, the first elastomeric propylene copolymer fractions (EPC1) has a comonomer content in the range of 20.0-35.0 wt %, more preferably, in the range 22.0-32.0 wt % and most preferably in the range of 24.0-30.0 wt %.

Preferably, the first elastomeric propylene copolymer fractions (EPC1) has an intrinsic viscosity (iV) measured according to ISO 1628-1 (at 135° C. in decaline) of 2.0-3.2 dl/g, more preferably of 2.2-3.1 dl/g still more preferably of 2.4-3.0 dl/g.

The second elastomeric propylene copolymer fractions (EPC2) preferably has a comonomer content in the range of 35.0-60.0 wt %, more preferably in the range of 38.0-55.0 wt % and most preferably within the range of 40.0-53.0 wt %.

The second elastomeric propylene copolymer fractions (EPC2) preferably has an intrinsic viscosity (iV) measured according to ISO 1628-1 (at 135° C. in decaline) of 3.2-4.5 dl/g, more preferably of 3.4-4.2 dl/g and most preferably of 3.5-4.0 dl/g.

The comonomer content of each of the first elastomeric propylene copolymer fractions (EPC1) and the second elastomeric propylene copolymer fractions (EPC2) can be measured for the first elastomeric propylene copolymer fractions (EPC1) and the mixture of first elastomeric propylene copolymer fractions (EPC1) and second elastomeric propylene copolymer fractions (EPC2). The second propylene copolymer fraction (EPC2) is then calculated. The calculation of the comonomer content is given below under "Examples".

If the elastomeric propylene copolymer (EPC) is prepared separately from the polypropylene constituting the matrix, it can be subsequently blended with the matrix polymer by any conventional blending means, e.g. melt blending in an extruder.

Alternatively, the elastomeric propylene copolymer (EPC) can be prepared as a reactor blend together with the propylene homo- and/or copolymer (PP) constituting the matrix (M), e.g. starting with the production of the matrix polymer in a loop reactor and optionally a gas phase reactor, followed by transferring the product into one or more gas phase reactors, where the elastomeric propylene copolymer (EPC) is polymerized.

Ad Component (c)

As component (c) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature $T_{m2}$ and a melting enthalpy $H_{m2}$ as determined by DSC analysis according to ISO 11357.

Preferably, $T_{m2}$ of the crystalline ethylene copolymer is within the range of 105° C. to 130° C., more preferably within the range of 110° C. to 127° C. and most preferably within the range of 112° C. to 124° C.

Preferably, $H_{m2}$ of the crystalline ethylene copolymer is less than 7 J/g, more preferably less than 6 J/g and most preferably less than 5 J/g.

Ad Component (d)

As component (d) polymeric nucleating agent (PNA) is present.

Preferably the polymeric nucleating agent is an alpha-nucleating agent, more preferably a polymeric alpha-nucleating agent, e.g. a vinylcycloalkane polymer and/or a vinylalkane polymer.

Said polymeric nucleating agent maybe introduced into the composition by blending with a masterbatch (MB) together with e.g. a carrier polymer or during polymerization of the heterophasic propylene copolymer (HECO), preferably, the polymeric nucleating agent is introduced into the composition by prepolymerizing the catalyst used to prepare a part or all of the heterophasic propylene copolymer (HECO).

Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

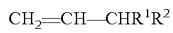

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

In case the nucleating agent is incorporated to the polypropylene composition in the form of a masterbatch (MB) said polymeric nucleating agent, which is preferably alpha-nucleating agent, most preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer (HECO). Most preferably the masterbatch (MB) comprises, preferably consists of a homopolymer or copolymer, preferably homopolymer, of propylene which has been nucleated according to BNT-technology as described below.

It is preferred that the nucleating agent is introduced to the polypropylene composition during the polymerization process of the heterophasic propylene copolymer (HECO). The nucleating agent is preferably introduced to the heterophasic propylene copolymer (HECO) by first polymerizing the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the heterophasic propylene copolymer (HECO). The above incorporation of the polymeric nucleating agent to the heterophasic propylene copolymer (HECO) during the polymerization of said heterophasic propylene copolymer (HECO) is called herein as BNT-technology as described below.

Said obtained reaction mixture is herein below referred interchangeably as modified catalyst system.

Preferably the polymeric nucleating agent is vinylcyclohexane (VCH) polymer which is introduced into the heterophasic propylene copolymer (HECO) by the BNT technology.

More preferably in this preferred embodiment, the amount of polymeric nucleating agent, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula: $CH_2=CH-CHR^1R^2$ as defined above.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When a nucleating agent is introduced to the heterophasic propylene copolymer (HECO) during the polymerization process, the amount of nucleating agent present in the heterophasic propylene copolymer (HECO) is preferably not more than 500 ppm, more preferably not more than 200 ppm, still more preferably is in the range of 1.0 to 200 ppm, and most preferably is 5.0 to 100 ppm, based on the heterophasic propylene copolymer (HECO) and the nucleating agent, preferably based on the total weight of the heterophasic propylene copolymer (HECO) including all additives.

The use of the polymeric nucleating agent in accordance with the present invention enables the preparation of heterophasic propylene copolymer (HECO) having highly satisfactory mechanical properties, i.e. for improved stiffness/impact balance, so that it is not required for the compositions in accordance with the present invention to contain low molecular weight nucleating agents, in particular costly particulate nucleating agents like organo-phosphates or soluble nucleants like sorbitol- or nonitol-derived nucleating agents.

Ad Heterophasic Composition

The heterophasic polypropylene copolymer (HECO) of the present inventions is further characterized by a total melt flow rate ($MFR_T$) (ISO 1133; 230° C.; 2.16 kg) in the range of 25.0 to 250.0 g/10 min, preferably in the range of 28.0 to 200 g/10 min, more preferably in the range of 32.0 to 150.0 g/10 min and even more preferably in the range of 34.0 to 100.0 g/10 min.

Preferably the final melt flow rate of the heterophasic propylene copolymer (HECO) is adjusted during the polymerization process. Accordingly the reactor-made heterophasic propylene copolymer (HECO) has the melt flow rate as defined above or in the claims. "Reactor-made heterophasic propylene copolymer (HECO)" denotes herein that the melt flow rate of the heterophasic propylene copolymer (HECO) has not been modified on purpose by post-treatment. Accordingly, in the preferred embodiment the heterophasic propylene copolymer (HECO) is non-visbroken, particularly not visbroken using peroxide. Accordingly, the melt flow rate is not increased by shortening the chain length of the heterophasic propylene copolymer (HECO) according to this invention by use of peroxide. Thus it is preferred that the heterophasic propylene copolymer (HECO) does not contain any peroxide and/or decomposition product thereof.

It is also appreciated that the total content of the comonomers, i.e. the sum of content of ethylene and α-olefins with 4 to 10 C-atoms, in the total heterophasic propylene copolymer (HECO) is rather moderate.

Accordingly it is preferred that the heterophasic propylene copolymer (HECO) has a total comonomer content, preferably ethylene content, in the range of 5.0 to 20.0 wt %, preferably in the range of 5.5 to 15.0 wt % and more preferably in the range of 6.0 to 13.0 wt %.

The Charpy notched impact strength of the heterophasic propylene copolymer (HECO) at 23° C. as measured according to ISO 179-1eA is in the range of 5.5 to 50.0 kJ/m², preferably in the range of 5.8 to 30.0 kJ/m² and more preferably in the range of 6.0 to 20.0 kJ/m².

The Charpy notched impact strength of the heterophasic polypropylene composition at −20° C. as measured according to ISO 179-1eA is preferably in the range of 1.5 to 10.0 kJ/m², preferably in the range of 2.0 to 9.0 kJ/m² and more preferably in the range of 2.2 to 8.0 kJ/m².

In addition the inventive heterophasic propylene copolymer (HECO) preferably follows the inequation:

$$NIS(23° C.) > 13 - 2.01 \ln(MFR_T)$$

wherein NIS(23° C.) is the Charpy notched impact strength of the heterophasic polypropylene composition at 23° C. as measured according to ISO 179-1eA and $\ln(MFR_T)$ is the natural logarithm of the total melt flow rate (ISO 1133; 230° C.; 2.16 kg).

Further, a specimen consisting of the heterophasic propylene copolymer (HECO) preferably has a puncture energy at +23° C. of at least 8.0 J, more preferably of at least 10.0 J, still more preferably of at least 15.0 J determined according to ISO 6603-2, and at −20° C. of at least 3.0 J, more preferably at least 4.0 J determined according to ISO 6603-2.

Furthermore, a specimen consisting of the heterophasic propylene copolymer (HECO) preferably has a puncture energy at +23° C. of not more than 80.0 J, more preferably of not more than 50.0 J, still more preferably of not more than 40.0 J, most preferably of not more than 35.0 J determined according to ISO 6603-2, and at −20° C. of not more than 30.0 J, more preferably not more than 25.0 J, even more preferably of not more than 20.0 J, and most preferably not more than 15.0 J, determined according to ISO 6603-2.

The heterophasic propylene copolymer (HECO) according to the invention has a tensile modulus of more than 1000 MPa, preferably more than 1100 MPa, still even more preferably more than 1200 MPa determined according to ISO 527-2 on injection ISO multipurpose moulded specimens prepared in accordance with EN ISO 1873-2.

The tensile modulus of the heterophasic polypropylene resin according to the invention will usually not be higher than 2000 MPa, preferably not higher than 1800 MPa.

In a preferred embodiment the heterophasic propylene copolymer (HECO) is preferably free of phthalic acid esters as well as their respective decomposition products, i.e. phthalic acid esters, typically used as internal donor of Ziegler-Natta catalysts used for its production. Preferably, the heterophasic propylene copolymer (HECO) is free of phthalic compounds as well as their respective decomposition products, i.e. phthalic compounds typically used as internal donor of Ziegler-Natta catalysts.

The term "free of" phthalic acid esters, preferably phthalic compounds, in the meaning of the present invention refers to a heterophasic propylene copolymer (HECO) in which no phthalic acid esters as well no respective decomposition products, preferably no phthalic compounds as well as no respective decomposition products at all originating from the Ziegler-Natta catalyst are detectable.

The heterophasic propylene copolymer (HECO) of the present invention is composed of components (a) and (b) and (d) and optional component (c).

Component (a) is present in an amount of from 70 to 90 wt %, preferably from 73 to 87 wt % and more preferably from 74 to 86 wt %

Component (b) is present in an amount of from 30 to 10 wt %, preferably from 27 to 13 wt % and more preferably from 26 to 14 wt %.

Component (c) is present in an amount of from 0 to 5.0 wt %, preferably from 0.1 to 4.0 wt % and more preferably from 0.2 to 3.0 wt %.

Component (d) is present in an amount of from 0.0001 to 0.1 wt %, preferably from 0.005 to 0.05 wt % and more preferably from 0.001 to 0.01 wt %.

If component (d) is added in the form of a masterbatch (MB), the amount of masterbatch containing component (d) is up to 10 wt % related to the entire heterophasic propylene copolymer (HECO), preferably up to 5 wt % and more preferably in the range of 1.5 to 3.5 wt % based on the entire heterophasic propylene copolymer (HECO).

The sum of fractions (a), (b), (c) and (d) is 100 wt % or lower depending on the presence of further fractions or additives. The ranges in percent by weight (wt %) as used herein define the amount of each of the fractions or components based on the entire heterophasic propylene copolymer (HECO) according to the present invention. All fractions and components together give a sum of 100 wt %.

The heterophasic propylene copolymer (HECO) according to the present invention apart from the polymeric components and the polymeric nucleating agent (d), optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic propylene copolymer (HECO).

Preparation of the Heterophasic Propylene Copolymer (HECO)

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

The heterophasic propylene copolymer (HECO) according to the invention is preferably prepared by a sequential polymerization process, as described below, in the presence of a catalyst system comprising a Ziegler-Natta Catalyst (ZN-C), a cocatalyst (Co) and optionally an external donor (ED), as described below.

The term "sequential polymerization system" according to this invention indicates that the nucleated heterophasic propylene copolymer (HECO) is produced in at least three reactors connected in series. Accordingly, the present polymerization system comprises at least a pre-polymerization reactor (PR), a first polymerization reactor (R1) and a second polymerization reactor (R2), a third polymerization reactor (R3) and optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

In this first polymerization reactor (R1) the first polypropylene fraction (PP1), preferably the first propylene homopolymer fraction (H-PP1), of the matrix polypropylene (PP) is produced.

Preferably this propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the $1^{st}$ gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and the third polymerization reactor (R3) and any subsequent reactor, for instance, the fourth polymerization reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec.

Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the third polymerization reactor (R3), and the optional fourth polymerization reactor (R4) are gas phase reactors (GPRs).

Accordingly for the instant process at least three, preferably three polymerization reactors (R1), (R2) and (R3) or four polymerization reactors (R1), (R2), (R3) and (R4), namely a slurry reactor (SR), like loop reactor (LR) and a (first) gas phase reactor (GPR1), a second gas phase reactor (GPR2), and optionally a third gas phase reactor (GPR3) connected in series are used.

Prior to the slurry reactor (SR) a pre-polymerization reactor is placed.

As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the third reactor (R3) and the optional the fourth reactor (R4) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., like 70 to 80° C.; and
(b) in the second polymerization reactor (R2) is in the range of 75 to 95° C., more preferably in the range of 78 to 92° C., still more preferably in the range of 78 to 88° C.,
with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 10 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume (VR) to the volumetric outflow rate from the reactor (Qo) (i.e. VR/Qo), i.e $\tau$=VR/Qo [tau=VR/Qo]. In case of a loop reactor the reaction volume (VR) equals to the reactor volume. Accordingly the average residence time ($\tau$) in the first polymerization reactor (R1) is preferably at least 5 min, more preferably in the range of 15 to 80 min, still more preferably in the range of 20 to 60 min, like in the range of 24 to 50 min, and/or the average residence time ($\tau$) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ($\tau$) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above the preparation of the heterophasic propylene copolymer (HECO) comprises in addition to the (main) polymerization of the propylene polymer in the at least three polymerization reactors (R1, R2, R3 and optional R4) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

Accordingly, the propylene polymer is preferably produced in a process comprising the following steps under the conditions set out above:

a) In the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). Subsequent to the pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final heterophasic propylene copolymer (HECO) is rather low and typically not more than 5.0 wt %, more preferably not more than 4.0 wt %, still more preferably in the range of 0.5 to 4.0 wt %, like in the range 1.0 of to 3.0 wt %.

b) In the first polymerization reactor (R1), i.e. in a loop reactor (LR), propylene is polymerized obtaining a first propylene homopolymer fraction (H-PP1) of the propylene homopolymer (H-PP), transferring said first propylene homopolymer fraction (H-PP1) to a second polymerization reactor (R2), c) in the second polymerization reactor (R2) propylene is polymerized in the presence of the first propylene homopolymer fraction (H-PP1) obtaining a second propylene homopolymer fraction (H-PP2) of the propylene homopolymer.

Said fraction [H-PP1+H-PP2] is further transferred to a third polymerization reactor R3 obtaining a either a third propylene homopolymer fraction (H-PP3) or a first propylene copolymer fractions (EPC1) in the presence of all fractions produced in earlier steps.

Optionally it is possible to transfer the entire polymer produced to a fourth polymerization reactor R4, i.e. either [H-PP1+H-PP2+H-PP3] or [H-PP1+H-PP2+EPC1], obtaining either a first propylene copolymer fractions (EPC1) or a second propylene copolymer fraction (EPC2) in the presence of all fractions produced in earlier steps.

So the nucleated polymer produced may comprise the following fractions:
the polypropylene (Pre-PP) produced in the pre-polymerization reactor (PR)+a first propylene homopolymer fraction (H-PP1)+a second propylene homopolymer fraction (H-PP2)+a propylene copolymer fractions (EPC1) or
the polypropylene (Pre-PP) produced in the pre-polymerization reactor (PR)+a first propylene homopolymer fraction (H-PP1)+a second propylene homopolymer fraction (H-PP2)+a third propylene homopolymer fraction (H-PP3)+a propylene copolymer fractions (EPC1) or
the polypropylene (Pre-PP) produced in the pre-polymerization reactor (PR)+a first propylene homopolymer fraction (H-PP1)+a second propylene homopolymer fraction (H-PP2)+a first propylene copolymer fractions (EPC1)+a second propylene copolymer fractions (EPC2).

Preferably the nucleated polymer produced comprises either
the polypropylene (Pre-PP) produced in the pre-polymerization reactor (PR)+a first propylene homopolymer fraction (H-PP1)+a second propylene homopolymer fraction (H-PP2)+a third propylene homopolymer fraction (H-PP3)+a propylene copolymer fractions (EPC1) or
the polypropylene (Pre-PP) produced in the pre-polymerization reactor (PR)+a first propylene homopolymer fraction (H-PP1)+a second propylene homopolymer fraction (H-PP2)+a first propylene copolymer fractions (EPC1)+a second propylene copolymer fractions (EPC2).

By using—as stated above—a loop reactor and at one or two gas phase reactor in serial configuration and working at different conditions, a multimodal (e.g. bimodal or trimodal) propylene homopolymer matrix (M) can be obtained.

If the loop reactor and the first gas phase reactor are run under conditions yielding similar polymers, an unimodal matrix can be obtained.

A preferred multistage process is a "loop-gas phase"-process, as developed by *Borealis* (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

As pointed out above in the specific process for the preparation of the heterophasic polypropylene composition as defined above, a specific Ziegler-Natta catalyst must be used.

Accordingly, the Ziegler-Natta catalyst will be now described in more detail.

The catalyst used in the present invention is a solid Ziegler-Natta catalyst, which comprises compounds of a transition metal of Group 4 to 6 of IUPAC, like titanium, a Group 2 metal compound, like a magnesium, and an internal donor being a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or MgCl2, but the catalyst is self-supported.

The Ziegler-Natta catalyst (ZN-C) can be further defined by the way as obtained.

Accordingly, the Ziegler-Natta catalyst (ZN-C) is preferably obtained by a process comprising the steps of
a)
- $a_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
- $a_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or
- $a_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
- $a_4$) providing a solution of Group 2 alkoxide of formula $M(OR_1)_n(OR_2)_m X_{2-n-m}$ or mixture of Group 2 alkoxides $M(OR_1)_n X_{2-n}$, and $M(OR_2)_m X_{2-m'}$, where M is Group 2 metal, X is halogen, $R_1$ and $R_2$ are different alkyl groups of $C_2$ to $C_{16}$ carbon atoms, and $0 \le n < 2$, $0 \le m < 2$ and $n+m+(2-n-m)=2$, provided that both n and m≠0, $0 \le n' \le 2$ and $0 < m' \le 2$; and b) adding said solution from step a) to at least one compound of a transition metal of Group 4 to 6 and
c) obtaining the solid catalyst component particles,
and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200-μm, preferably 10 to 100. Particles are compact with low porosity and have surface area below 20 g/m², more preferably below 10 g/m². Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272 which are incorporated here by reference.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

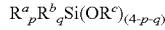

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are $(tert$-butyl$)_2$ $Si(OCH_3)_2$, (cyclohexyl)(methyl)$Si(OCH_3)_2$, (phenyl)$_2$Si $(OCH_3)_2$ and (cyclopentyl)$_2$$Si(OCH_3)_2$, or of general formula

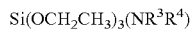

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition according to this invention is preferably produced in the presence of
(a) a Ziegler-Natta catalyst comprising compounds (TC) of a transition metal of Group 4 to 6 of IUPAC, a Group 2 metal compound and an internal donor, wherein said internal donor is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

As mentioned above the Ziegler-Natta catalyst (ZN-C) is preferably modified by the so called BNT-technology during the above described pre-polymerization step in order to introduce the polymeric nucleating agent.

Such a polymeric nucleating agent is as described above a vinyl polymer, such as a vinyl polymer derived from monomers of the formula

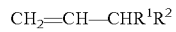

as described above.

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 60° C., preferably 15 to 55° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification. Use of Heterophasic Heterophasic Propylene Copolymer (HECO)

The polypropylene composition according to the invention can be used in various application fields, due to its improved stiffness/impact balance.

Thus, according to a further embodiment of the invention the heterophasic propylene copolymer (HECO) of the invention is used for the production of films, extruded, blow moulded or injection moulded articles, such as pouches and bags, pipes and fittings, transport packaging containers as well as components for car exteriors and interiors, like dashboards, door claddings, consoles, bumpers and trims.

Further, the present invention is also directed to an article made of the inventive heterophasic propylene copolymer (HECO), particularly a film, an extruded, blow moulded or injection moulded article.

The present invention is further concerned with a moulded article comprising the processed heterophasic propylene copolymer (HECO) as described herein. The main end-uses for such moulded articles are in packaging applications like thin wall packaging for frozen or fresh food, adhesives, cosmetics or pharmaceuticals. Other end-uses are plastic containers and household articles, but also medical products, rigid packaging like detergent cartons, cup and plate boards for oven or microwave use or sterilizable food packaging, especially for deep freeze or refrigerator uses. The present invention provides the specific advantage that such articles may be produced with lower wall thicknesses without expense in the flowability of the polypropylene compositions and still having excellent impact properties. Furthermore the stiffness/impact balance of the articles produced with the heterophasic propylene copolymer (HECO) of the present invention is excellent.

The article is produced by any common conversion process suitable for thermoplastic polymers like injection moulding, extrusion blow moulding, injection stretch blow moulding or cast film extrusion.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E=0.5(S\beta\beta+S\beta\gamma+S\beta\delta+0.5(S\alpha\beta+S\alpha\gamma))$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\%] = 100 * fE$$

The weight percent comonomer incorporation was calculated from the mole fraction:

$$E[wt\%] = 100 * (fE * 28.06)/((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules (1982) 1150). This method was chosen for its robust nature and integration regions slightly adjusted to increase applicability to a wider range of comonomer contents.

The Xylene Soluble Fraction at Room Temperature (XCS, Wt %):

The amount of the polymer soluble in xylene is determined at 25° C. according to ISO 16152; 5th edition; 2005-07-01.

Intrinsic Viscosity (iV)

The intrinsic viscosity (V) value increases with the molecular weight of a polymer. The iV values e.g. of the XCS were measured according to ISO 1628/1 in decalin at 135° C.

DSC Analysis, Melting Temperature ($T_m$), Melting Enthalpy ($H_m$), Crystallization Temperature ($T_a$) and Crystallization Enthalpy ($H_e$):

measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_a$) and crystallization enthalpy ($H_e$) are determined from the cooling step, while melting temperature ($T_m$) and melting enthalpy ($H_m$) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 $mm_3$) between −100° C. and +150° C. with a heating rate of 2° C./min and a frequency of 1 Hz.

$MFR_2$ (230° C.) is Measured According to ISO 1133 (230° C., 2.16 kg Load)

The melt flow rate is measured as the $MFR_2$ in accordance with ISO 1133 15 (230° C., 2.16 kg load) for polypropylene and in accordance with ISO 1133 (190° C., 2.16 kg load) for polyethylene and is indicated in g/10 min. The $MFR_2$ of a fraction (B) produced in the presence of a fraction (A) is calculated using the measured values of $MFR_2$ of fraction (A) and the mixture received after producing fraction (B) ("final"):

$$Log(MFR_{final}) = \text{weight fraction}(A) * Log(MFR_A) + \text{weight fraction}(B) * Log(MFR_B)$$

Charpy Notched Impact Strength

Charpy notched impact is measured according to ISO 179/1eA at +23° C. and at −20° C. using an injection moulded test specimen (80×10×4 mm) as produced according to ISO 1873.

Tensile Properties

Tensile properties were determined according to ISO 527-2 on injection ISO multipurpose moulded specimens prepared in accordance with EN ISO 1873-2.

Tensile modulus (in MPa) was determined according to ISO 527-2. The measurement was conducted at 23° C. with an elongation rate of 1 mm/min.

Melting Temperature

Melting temperature ($T_m$) was measured with a Mettler TA820 differential scanning calorimetry (DSC) apparatus on 5 to 10 mg samples. DSC was performed according to ISO 3146 (part 3, method C2) in a heat/cool/heat 15 cycle with a scan rate of 10° C./min in the temperature range of +23 to +210° C. Melting temperature was determined from the second heating step.

Puncture energy (IPT) is determined in the instrumented falling weight test according to ISO 6603-2 using injection moulded plaques of 60×60×2 mm and a test speed of 2.2 m/s, clamped, lubricated striker with 20 mm diameter. The reported puncture energy results from an integral of the failure energy curve measured at (60×60×2 mm).

Calculations:

Calculation of the Xylene Cold Soluble (XCS) Content of the Second Polypropylene Fraction (PP2):

$$\frac{XS(R2) - w(PP1) \times XS(PP1)}{w(PP2)} = XS(PP2)$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), XS(PP1) is the xylene cold soluble (XCS) content [in wt %] as determined at 25° C. according to ISO 16152; 5th edition; 2005-07-01 of the first polypropylene fraction (PP1), i.e. of the product of the first reactor (R1), XS(R2) is the xylene cold soluble (XCS) content [in wt %] as determined at 25° C. according to ISO 16152; 5th edition; 2005-07-01 of the product obtained in the second reactor (R2), i.e. the mixture of the first polypropylene fraction (PP1) and the second polypropylene fraction (PP2), XS(PP2) is the calculated xylene cold soluble (XCS) content [in wt %] of the second polypropylene fraction (PP2).

Calculation of Xylene Cold Soluble (XCS) Content of the Third Polypropylene Fraction (PP3) if Present:

$$\frac{XS(R3) - w(R2) \times XS(R2)}{w(PP3)} = XS(PP3)$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), XS(R2) is the xylene cold soluble (XCS) content [in wt %] as determined at 25° C. according to ISO 16152; 5$^{th}$ edition; 2005-07-01 of the product of the second reactor (R2), i.e. of the mixture of the first polypropylene fraction (PP1) and second polypropylene fraction (PP2), XS(R3) is the xylene cold soluble (XCS) content [in wt %] as determined at 25° C. according to ISO 16152; 5$^{th}$ edition; 2005-07-01 of the product obtained in the third reactor (R3), i.e. the mixture of the first polypropylene fraction (PP1), the second polypropylene fraction (PP2), and the third polypropylene fraction (PP3), XS(PP3) is the calculated xylene cold soluble (XCS) content [in wt %] of the third polypropylene fraction (PP3).

Calculation of Melt Flow Rate MFR2 (230° C.) of the Second Polypropylene Fraction (PP2):

$$MFR(PP2) = 10^{\left[\frac{\log(MFR(R2)) - w(PP1) \times \log(MFR(PP1))}{w(PP2)}\right]}$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), MFR(PP1) is the melt flow rate MFR2 (230° C.) [in g/10 min] measured according ISO 1133 of the first polypropylene fraction (PP1), i.e. of the product of the first reactor (R1), MFR(R2) is the melt flow rate MFR2 (230° C.) [in g/10 min] measured according ISO 1133 of the product obtained in the second reactor (R2), i.e. the mixture of the first polypropylene fraction (PP1) and the second polypropylene fraction (PP2), MFR(PP2) is the calculated melt flow rate MFR2 (230° C.) [in g/10 min] of the second polypropylene fraction (PP2).

Calculation of Melt Flow Rate MFR2 (230° C.) of the Third Polypropylene Fraction (PP3) if Present:

$$MFR(PP3) = 10^{\left[\frac{\log(MFR(R3)) - w(R2) \times \log(MFR(R2))}{w(PP3)}\right]}$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), MFR(R2) is the melt flow rate MFR2 (230° C.) [in g/10 min] measured according ISO 1133 of the product of the second reactor (R2), i.e. of the mixture of the first polypropylene fraction (PP1) and second polypropylene fraction (PP2), MFR(R3) is the melt flow rate MFR2 (230° C.) [in g/10 min] measured according ISO 1133 of the product obtained in the third reactor (R3), i.e. the mixture of the first polypropylene fraction (PP1), the second polypropylene fraction (PP2), and the third polypropylene fraction (PP3), MFR(PP3) is the calculated melt flow rate MFR2 (230° C.) [in g/10 min] of the third polypropylene fraction (PP3).

The same systematic is used for calculations of properties of the optional second propylene copolymer fraction (EPC2), e.g. comonomer content and intrinsic viscosity.

Thus, for the calculation of not directly determined intrinsic viscosities and comonomer contents of fractions the same linear mixing rule as for the xylene solubles content (XS) is used. The respective assumptions for a composition comprising N fractions are:

$$iV_{total} = \sum_{n=1}^{N} w_n iV_n$$

and $$C2_{total} = \sum_{n=1}^{N} w_n C2_n$$

B. Examples

The catalyst used in the polymerization process for the heterophasic propylene copolymer (HECO) of the inventive examples (IE 1 to 3) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of the Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and di(cyclopentyl) dimethoxy silane (D-donor) as donor The molar ratio of co-catalyst (Co) to external donor (ED) [Co/ED] and the molar ratio of co-catalyst (Co) to titanium compound (TC) [Co/TC] are indicated in table 1.

VCH Modification of the Catalyst 35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared as described above (Ti content 1.4 wt %) was added and after additionally 20 minutes 5.0 g of vinylcyclohexane (VCH) was added.). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

Polymerization was performed in a Borstar pilot plant, comprising a prepolymerization reactor, a loop reactor and three gas phase reactors connected in series. The polymerization conditions are also indicated in table 1. As external donor Donor D was used.

In Example 1 a trimodal propylene homopolymer matrix was produced in the loop reactor and in the subsequent gas phase reactors (GPR1+GPR2). In the $3^{rd}$ gas phase reactor (GPR3) a unimodal elastomeric propylene copolymer (EPC=EPC1) was prepared in the presence of the matrix polymer.
Matrix split: 49 wt % loop+36 wt % GPR1+15 wt % GPR2
elastomeric propylene copolymer (EPC): 100 wt % in GPR3
full split: 41/30/12/17

In Example 2 a unimodal propylene homopolymer matrix was produced in the loop reactor and in the subsequent gas phase reactor (GPR1). In the 2nd gas phase reactor (GPR2) a unimodal elastomeric propylene copolymer (EPC=EPC1) was prepared in the presence of the matrix polymer.
Matrix split: 63 wt % loop and 37 wt % GPR1
elastomeric propylene copolymer (EPC) split: 100 wt % in GPR2

In Example 3 a bimodal propylene homopolymer matrix was produced in the loop reactor and in the subsequent gas phase reactor (GPR1). In the 2nd gas phase reactor (GPR2) and the $3^{rd}$ gas phase reactor (GPR3) the elastomeric propylene copolymer fractions (EPC1+EPC2) were prepared in the presence of the matrix polymer, yielding a bimodal elastomeric propylene copolymer (EPC).
Matrix split: 54 wt % loop and 46 wt % GPR1
elastomeric propylene copolymer (EPC): 63 wt % EPC1 in GPR2 and 37 wt % EPC2 in GPR3

The properties of the products obtained from the individual reactors naturally are not measured on homogenized material but on reactor samples (spot samples). The properties of the final resin are measured on homogenized material, the $MFR_2$ on pellets made thereof.

TABLE 1

Polymerization data for IE1 to IE3

| | IE 1 | IE 2 | IE 3 |
|---|---|---|---|
| TEAL/Ti [mol/mol] | 368 | 424 | 390 |
| TEAL/Donor [mol/mol] | 7 | 7 | 7 |
| Prepolymerization | | | |
| Temperature [° C.] | 28 | 28 | 28 |
| Residence time [h] | 0.27 | 0.25 | 0.27 |
| Loop R1 | | | |
| R1 Temperature [° C.] | 75 | 80 | 75 |
| R1 pressure [bar] | 50 | 55 | 55 |
| R1 Residence time [h] | 0.32 | 0.25 | 0.19 |
| R1 H2/C3 ratio [mol/kmol] | 19.6 | 22.2 | 36.7 |
| R1 C2/C3 ratio [mol/kmol] | 0 | 0 | 0 |
| R1 Split [%] | 41 | 52 | 44 |
| R1 MFR2 [g/10 min] | 179 | 194 | 511 |
| R1XCS [wt %] | 3.5 | 3.1 | 4.2 |
| GPR1 R2 | | | |
| R2 Temperature [° C.] | 80 | 80 | 80 |
| R2 pressure [bar] | 21 | 21 | 21 |
| R2 Residence time [h] | 2.72 | 1.26 | 1.54 |
| R2 C2/C3 ratio [mol/kmol] | 0 | 0 | 0 |
| R2 H2/C3 ratio (mol/kmol) | 159.7 | 175.7 | 202.6 |
| R2 split [%] | 30 | 31 | 38 |
| R2 MFR2 [g/10 min] | 159 | 172 ($MFR_M$) | 339 ($MFR_M$) |
| Calculated MFR2 for GPR1 product | 134 | 140 | 210 |
| R2 XCS [wt. %] | 2.8 | 1.8 | 2.5 |
| R2 Ethene content [wt. %] | 0 | 0 | 0 |
| GPR2 R3 | | | |
| R3 Temperature (° C.) | 75 | 75 | 75 |
| R3 Pressure [bar] | 19 | 19 | 19 |
| R3 Residence time [h] | 0.28 | 1.26 | 0.13 |
| R3 C2/C3 ratio [mol/kmol] | 2.8 | 254.03 | 118.98 |
| R3H2/C2 ratio [mol/kmol] | 273.1 | 130.6 | 171.7 |
| R3 split [%] | 12 | 17 | 11 |
| R3 MFR2 [g/10 min] | 89 ($MFR_M$) | 60 | 120 |
| Calculated MFR2 for GPR2 product | 2.6 | 0.36 | 0.78 |
| R3 XCS [wt. %] total | 2.3 | 18.5 | 12.2 |
| R3 C2 [wt %] | 0 | 6.3 | 3.3 |
| R3 C2(XCS) [wt %] | 0 | 37.0 | 27.5 |
| R3 iV (XCS) [dl/g] | n.d. | 3.2 | 2.8 |
| GPR3 R4 | | | |
| R4 Temperature (° C.) | 80 | — | 80 |
| R4 Pressure [bar] | 17 | — | 17 |
| R4 Residence time [h] | 0.21 | — | 0.25 |
| R4 C2/C3 ratio [mol/kmol] | 345.4 | — | 351.3 |
| R4 H2/C2 ratio [mol/kmol] | 79.6 | — | 45.4 |
| R4 split [%] | 17 | — | 7 |
| Final product | | | |
| $MFR_2$ [g/10 min] | 40 | 63 | 83 |
| C2 content [wt. %]total | 7.6 | 6.3 | 7.2 |
| XCS [wt %] | 19 | 19 | 20 |
| C2 of XCS [wt %] | 40 | 37 | 36 |
| Intrinsic viscosity of XCS [dl/g] | 3.2 | 3.2 | 3.2 |

For the Comparative Examples CE1 to CE3 the Following Catalyst was Prepared:

Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP 491566, EP 591224 and EP 586390.

VCH Modification of the Catalyst

This example was done in accordance with Example 1b, but as catalyst was used a phthalate containing catalyst prepared according to example C2a). (Ti content 1.8 wt %) 52 ml of oil, 1.17 g TEAL, 0.73 g donor D were used. The reaction temperature was 65° C. with this catalyst. The concentration of unreacted VCH in the final catalyst was 200 ppm weight. The concentration of unreacted VCH is almost twice as high with this phthalate containing catalyst, despite the higher reaction temperature, as with the phthalate free catalyst described as for Inventive Examples.

As external donor di(cyclopentyl) dimethoxy silane (donor D) was used.

The same polymer design as for the Inventive Examples was chosen for CE1 to CE3

TABLE 2

Polymerization of comparative examples

|  | CE 1 | CE 2 | CE 3 |
|---|---|---|---|
| TEAL/Ti [mol/mol] | 200 | 200 | 200 |
| TEAL/Donor [mol/mol] | 15 | 15 | 15 |
| Prepolymerization |  |  |  |
| Temperature [° C.] | 30 | 30 | 30 |
| Residence time [h] | 0.3 | 0.3 | 0.3 |
| Loop R1 |  |  |  |
| R1 Temperature [° C.] | 75 | 75 | 75 |
| R1 pressure [bar] | 55 | 55 | 55 |
| R1 Residence time [h] | 0.3 | 0.4 | 0.5 |
| R1 H2/C3 ratio [mol/kmol] | 30 | 25 | 25 |
| R1 C2/C3 ratio [mol/kmol] | 0 | 0 | 0 |
| R1 Split [%] | 38 | 50 | 60 |
| R1 MFR2 [g/10 min] | 205 | 155 | 430 |
| R1 XCS [wt %] | 2.0 | 2.0 | 2.2 |
| GPR1 R2 |  |  |  |
| R2 Temperature [° C.] | 80 | 80 | 85 |
| R2 pressure [bar] | 32 | 33 | 25 |
| R2 Residence time [h] | 1.8 | 1.7 | 1.2 |
| R2 C2/C3 ratio [mol/kmol] | 0 | 0 | 0 |
| R2 H2/C3 ratio [mol/kmol] | 180 | 205 | 177 |
| R2 split [%] | 34 | 32 | 19 |
| R2 MFR2 [g/10 min]total | 160 | 161 (MFR$_M$) | 445 (MFR$_M$) |
| Calculated MFR2 for GPR1 product | 95 | 161 | 500 |
| R2 XCS [wt %] | 2.1 | 2.0 | 2.3 |
| R2 C2 content [wt. %] | 0 | 0 | 0 |
| GPR2 R3 |  |  |  |
| R3 Temperature [° C.] | 85 | 80 | 75 |
| R3 Pressure [bar] | 31 | 32 | 22 |
| R3 Residence time [h] | 2.3 | 1.2 | 1.0 |
| R3 C2/C3 ratio [mol/kmol] | 2 | 505 | 210 |
| R3 H2/C2 ratio [mol/kmol]* | 30* | 210 | 730 |
| R3 split [%] | 12 | 18 | 15 |
| R3 MFR2 [g/10 min] | 65 (MFR$_M$) | 67 | 120 |
| Calculated MFR2 for GPR2product | 6 | 1.3 | 0.25 |
| R3 XCS [wt %] | 3.2 | 18 | 15 |
| R3 C2 [wt %] | 0.1 | 7.6 | 3.9 |
| R3 C2(XCS) [wt %] | 3.5 | 42 | 24 |
| R3 iV(XCS) [dl/g] | n.d. | 2.6 | 2.1 |
| GPR3 R4 |  |  |  |
| R4 Temperature [° C.] | 80 | — | 75 |
| R4 Pressure [bar] | 22 | — | 15 |
| R4 Residence time [h] | 0.9 | — | 0.8 |
| R4 C2/C3 ratio [mol/kmol] | 490 | — | 720 |
| R4 H2/C2 ratio [mol/kmol] | 200 | — | 50 |
| R4 split [%] | 16 | — | 6 |

TABLE 2-continued

Polymerization of comparative examples

|  | CE 1 | CE 2 | CE 3 |
|---|---|---|---|
| Final product |  |  |  |
| MFR2 [g/10 min] | 37 | 67 | 95 |
| C2 content [wt. %] total | 6.5 | 7.6 | 8.6 |
| XCS [wt %] | 16 | 18 | 22 |
| C2 of XCS [wt %] | 40 | 42 | 39 |
| Intrinsic viscosity of XCS [dl/g] | 2.6 | 2.6 | 3.2 |

*H2/C3 ratio for CE1

The properties of the products obtained from the individual reactors naturally are not measured on homogenized material but on reactor samples (spot samples). The properties of the final resin are measured on homogenized material, the MFR2 on pellets made thereof in an extrusion mixing process as described below.

All resins were mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additive In Table 3 the mechanical polymer parameters are listed:

| Parameter | unit | CE1 | IE1 | CE2 | IE2 | CE3 | IE3 |
|---|---|---|---|---|---|---|---|
| Tensile Modulus | MPa | 1597 | 1654 | 1574 | 1480 | 1431 | 1387 |
| NIS 1eA +23° C. | kJ/m² | 5.3 | 6.5 | 3.6 | 7.7 | 3.5 | 7.5 |
| NIS 1eA −20° C. | kJ/m² | 2.6 | 3.7 | 1.97 | 3.9 | 2.1 | 2.5 |
| IPT +23° C. | J | 25.8 | 17.7 | 18.9 | 16.6 | 5.0 | 20.5 |
| IPT −20° C. | J | 9.7 | 11.0 | 9.9 | 7.8 | 1.5 | 4.3 |
| NIS (23° C.) > 13-2.01 ln(MFR$_T$) |  | no | yes | no | yes | no | yes |

From Table 3 and from FIG. 1 it can be clearly seen that the inventive heterophasic propylene copolymer (HECO) have an improved stiffness/impact balance over the comparative examples.

FIG. 2 shows that the requirement of the relation between NIS and MFR (total) is only met for the Inventive Examples

The invention claimed is:

1. Heterophasic propylene copolymer (HECO) comprising:
   (a) 70 to 90 wt % of a matrix (M) being a polypropylene (PP), said polypropylene (PP) comprises a first polypropylene fraction (PP1) and a second polypropylene fraction (PP2) and optionally a third polypropylene fraction (PP3), and having a matrix melt flow rate (MFR$_M$) as determined at 230° C. and 2.16 kg load according ISO 1133 in the range of 50.0 to 1000.0 g/10 min, and
   (b) 10 to 30 wt % of an elastomeric propylene copolymer (EPC) being a copolymer of propylene and ethylene and/or an α-olefin with 4-10 carbon atoms and being dispersed in said matrix (M), said elastomeric propylene copolymer (EPC) comprises at least one propylene copolymer fraction (EPC1) and optionally a second propylene copolymer fraction (EPC2),
   wherein the elastomeric propylene copolymer (EPC) is the xylene cold soluble fraction (XCS) determined at 25° C. according ISO 16152 of the heterophasic propylene copolymer (HECO) and has an intrinsic viscosity (iV) measured according to ISO 1628-1 (at 135° C. in decaline) in the range of 2.0 dl/g-4.0 dl/g;

wherein the elastomeric propylene copolymer (EPC) has a total ethylene content, in the range of 25.0 to 45.0 wt %, (c) optionally 0 to 5.0 wt % of a crystalline ethylene copolymer (CEC) with an α-olefin with 3-10 carbon atoms being present in the composition as inclusions of the dispersed particles of (b), and (d) 0.0001 to 0.1 wt % of a polymeric nucleating agent (PNA), wherein if component (d) is added in the form of a masterbatch (MB), the amount of masterbatch containing component (d) is up to 10 wt % related to the heterophasic propylene copolymer (HECO), wherein the heterophasic propylene copolymer (HECO) can comprise optional additives, and the sum of fractions (a), (b), (c) and (d) and optional additives is 100 wt %; and wherein:

(i) said heterophasic propylene copolymer (HECO) has a total melt flow rate ($MFR_T$) (230° C.) measured according to ISO 1133 in the range of 25.0 g/10 min to 250 g/10 min.

2. Heterophasic propylene copolymer (HECO) according to claim 1, which comprises:

(a) a matrix (M) being a polypropylene (PP), said polypropylene (PP) comprises three polypropylene fractions (PP1), (PP2) and a third polypropylene fraction (PP3), whereby the polypropylene (PP) is a random propylene copolymer (R-PP) or a propylene homopolymer (HPP), and (b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises only one propylene copolymer fraction (EPC1), (c) optionally a crystalline ethylene copolymer (CEC) with an α-olefin with 3-10 carbon atoms being present in the composition as inclusions of the dispersed particles of (b), and (d) a polymeric nucleating agent (PNA).

3. Heterophasic propylene copolymer (HECO) according to claim 1, which comprises:

(a) a matrix (M) being a polypropylene (PP), said polypropylene (PP) comprises two polypropylene fractions (PP1) and (PP2), whereby the polypropylene (PP) is a random propylene copolymer (R-PP) or a propylene homopolymer (HPP), and (b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises:

(b-1) either only one propylene copolymer fraction (EPC1) or (b-2) two propylene copolymer fractions (EPC1) and (EPC2), (c) optionally a crystalline ethylene copolymer (CEC) with an α-olefin with 3-10 carbon atoms being present in the composition as inclusions of the dispersed particles of (b), and (d) a polymeric nucleating agent (PNA).

4. Heterophasic propylene copolymer (HECO) according to claim 2, wherein all three polypropylene fractions (PP1), (PP2) and (PP3) are propylene homopolymers, which differ from each other by the melt flow rate, whereby one of the three polypropylene fractions (PP1), (PP2) and (PP3) has a melt flow rate MFR2 (230° C.) measured according to ISO 1133 in the range of 1.0 to 15.0 g/10 min, another fraction of the three polypropylene fractions (PP1), (PP2) and (PP3) has a melt flow rate MFR2 (230° C.) measured according to ISO 1133 in the range of 80.0 to 500.0 g/10 min and the remaining polypropylene fraction of the three polypropylene fractions (PP1), (PP2) and (PP3), has a melt flow rate MFR2 (230° C.) measured according to ISO 1133 in the range of 10.0 to 300.0 g/10 min.

5. Heterophasic propylene copolymer (HECO) according to claim 2, wherein the first polypropylene fraction (PP1) has a melt flow rate MFR2 (230° C.) measured according to ISO 1133 in the range of 80.0 to 500.0 g/10 min, the second polypropylene fraction (PP2) has a melt flow rate MFR2 (230° C.) measured according to ISO 1133 in the range of 10.0 to 300.0 g/10 min and the third polypropylene fraction (PP3) has a melt flow rate MFR2 (230° C.) measured according to ISO 1133 in the range of 1.0 to 15.0 g/10 min, and wherein the first polypropylene fraction (PP1) is present in an amount of 30.0 to 45.0 wt %, the second polypropylene fraction (PP2) is present in an amount of 25.0 to 40.0 wt % and the third polypropylene fraction (PP3) is present in an amount of 5.0 to 20.0 wt %, all weight percentages related to the matrix and summing up to 100% of the matrix.

6. Heterophasic propylene copolymer (HECO) according to claim 3, wherein both polypropylene fractions (PP1) and (PP2) are propylene homopolymers, whereby the melt flow rate of the (PP1) fraction is higher than the melt flow rate of the (PP2) fraction, the ratio MFR(PP1)/MFR(PP2) being in the range of 2 to 10.

7. Heterophasic propylene copolymer (HECO) according to claim 1, wherein the elastomeric propylene copolymer (EPC):

a) constitutes the amount of the xylene cold soluble (XCS) fraction of the heterophasic propylene copolymer (HECO), which is in the range of 10.0 to 30.0 wt % with respect to the heterophasic propylene copolymer, and b) has an intrinsic viscosity (iV) measured according to ISO 1628-1 (at 135° C. in decaline) of in the range of 2.0 to 4.0 dl/g.

8. Heterophasic propylene copolymer (HECO) according to claim 1, wherein the elastomeric propylene copolymer (EPC) is unimodal with respect to the intrinsic viscosity and/or the comonomer distribution and consists of one propylene copolymer fraction (EPC1).

9. Heterophasic propylene copolymer (HECO) according to claim 1, wherein the elastomeric propylene copolymer (EPC) consists of first propylene copolymer fraction (EPC1) and a second propylene copolymer fraction (EPC2), which differ in view of the intrinsic viscosity and/or the comonomer distribution.

10. Heterophasic propylene copolymer (HECO) according to claim 1, wherein the elastomeric propylene copolymer (EPC) consists of first propylene copolymer fraction (EPC1) and a second propylene copolymer fraction (EPC2), wherein the first elastomeric propylene copolymer fraction (EPC1) has a comonomer content in the range of 20.0-35.0 wt % and an intrinsic viscosity (iV) measured according to ISO 1628-1 (at 135° C. in decaline) of 2.0-3.2 dl/g, and the second elastomeric propylene copolymer fraction (EPC2) has a comonomer content in the range of 35.0-60.0 wt %, and an intrinsic viscosity (iV) measured according to ISO 1628-1 (at 135° C. in decaline) of 3.2-4.5 dl/g.

11. Heterophasic propylene copolymer (HECO) according to claim 1, wherein the polymeric nucleating agent is present and is introduced into the heterophasic propylene copolymer (HECO) by blending with a masterbatch (MB) together with a carrier polymer or during polymerization of the heterophasic propylene copolymer (HECO) and is a vinyl polymer derived from monomers of the formula:

$$CH_2=CH-CHR^1R^2$$

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms or independently represent a linear or branched $C_4$-$C_{30}$ alkane, $C_4$-$C_{20}$ cycloalkane or $C_4$-$C_{20}$ aromatic ring.

12. Heterophasic propylene copolymer (HECO) according to claim 1, wherein the polymeric nucleating agent present and is a vinyl polymer derived from monomers selected from vinyl cycloalkanes.

13. Heterophasic propylene copolymer (HECO) according to claim 1, wherein
a) total melt flow rate ($MFR_T$) (ISO 1133; 230° C.; 2.16 kg) in the range of 25.0 to 250.0 g/10 min,
b) a total ethylene content, in the range of 5.0 to 20.0 wt %,
c) a Charpy notched impact strength of the heterophasic propylene copolymer (HECO) at 23° C. as measured according to ISO 179-1eA is in the range of 5.5 to 50.0 kJ/m$^2$,
d) a Charpy notched impact strength of the heterophasic polypropylene composition at −20° C. as measured according to ISO 179-1eA in the range of 1.5 to 10.0 kJ/m$^2$.

14. Heterophasic propylene copolymer (HECO) according to claim 1, wherein heterophasic propylene copolymer (HECO) follows the inequation:

$$NIS(23° C.) > 13 - 2.01 \ln(MFR_T)$$

wherein NIS(23° C.) is the Charpy notched impact strength of the heterophasic polypropylene composition at 23° C. as measured according to ISO 179-1eA, and
$\ln(MFR_T)$ is the natural logarithm of the total melt flow rate (ISO 1133; 230° C.; 2.16 kg).

15. Heterophasic propylene copolymer (HECO) according to claim 1, wherein the heterophasic propylene copolymer (HECO) has a puncture energy at +23° C. of at least 8.0 J and at −20° C. of at least 3.0 J, determined according to ISO 6603-2.

16. Heterophasic propylene copolymer (HECO) according to claim 1, wherein the heterophasic propylene copolymer (HECO) has a tensile modulus of more than 1000 MPa, determined according to ISO 527-2 on injection ISO multipurpose moulded specimens prepared in accordance with EN ISO 1873-2.

17. Heterophasic propylene copolymer (HECO) according to claim 1, wherein the heterophasic propylene copolymer (HECO) is produced in a sequential multi-reactor polymerization process in the presence of:
a) a Ziegler-Natta catalyst comprising compounds (TC) of a transition metal of Group 4 to 6 of IUPAC, a Group 2 metal compound and an internal donor, wherein said internal donor is a non-phthalic compound;
b) a co-catalyst (Co), and
c) optionally an external donor (ED) and
wherein said internal donor is selected from the group comprising malonates, maleates, succinates, citraconates, glutarates, cyclohexene-1,2-dicarboxylates and benzoates, and any derivatives and/or mixtures thereof.

18. Process for the production of a heterophasic propylene copolymer (HECO) according to claim 1, comprising polymerizing propylene in at least 3 subsequent polymerization steps in the presence of:
a) a Ziegler-Natta catalyst comprising compounds (TC) of a transition metal of Group 4 to 6 of IUPAC, a Group 2 metal compound and an internal donor, wherein said internal donor is a non-phthalic compound; being selected from the group comprising malonates, maleates, succinates, citraconates, glutarates, cyclohexene-1,2-dicarboxylates and benzoates, and any derivatives and/or mixtures thereof.
b) a co-catalyst (Co), and
c) optionally an external donor (ED)
and introducing the polymeric nucleating agent either in a prepolymerization step or in the form of a masterbatch (MB) together with a carrier polymer.

* * * * *